(12) United States Patent
Hein et al.

(10) Patent No.: US 7,111,170 B2
(45) Date of Patent: Sep. 19, 2006

(54) DISTRIBUTED SYSTEM FOR RESPONDING TO WATERMARKED DOCUMENTS

(75) Inventors: William Hein, Glenmoore, PA (US); Geoffrey B. Rhoads, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 861 days.

(21) Appl. No.: 10/113,099

(22) Filed: Mar. 29, 2002

(65) Prior Publication Data

US 2002/0112165 A1    Aug. 15, 2002

Related U.S. Application Data (63) Continuation-in-part of application No. 09/571,422, filed on May 15, 2000, now Pat. No. 6,947,571, and a continuation-in-part of application No. 09/552,998, filed on Apr. 19, 2000, now abandoned, and a continuation-in-part of application No. 09/547,664, filed on Apr. 12, 2000, and a continuation-in-part of application No. 09/543,125, filed on Apr. 5, 2000, and a continuation-in-part of application No. 09/531,076, filed on Mar. 18, 2000, and a continuation-in-part of application No. 09/342,688, filed on Jun. 29, 1999, now Pat. No. 6,650,761, and a continuation-in-part of application No. 09/342,689, filed on Jun. 29, 1999, now Pat. No. 6,311,214, and a continuation-in-part of application No. 09/342,971, filed on Jun. 29, 1999, now abandoned, and a continuation-in-part of application No. 09/343,101, filed on Jun. 29, 1999, now abandoned, and a continuation-in-part of application No. 09/343,104, filed on Jun. 29, 1999, now abandoned, which is a continuation-in-part of application No. 09/314,648, filed on May 19, 1999, now Pat. No. 6,681,028.

(60) Provisional application No. 60/164,619, filed on Nov. 10, 1999, provisional application No. 60/163,332, filed on Nov. 3, 1999, provisional application No. 60/158,015, filed on Oct. 6, 1999, provisional application No. 60/151,586, filed on Aug. 30, 1999, provisional application No. 60/141,468, filed on Jun. 29, 1999.

(51) Int. Cl.
*H04L 9/00* (2006.01)
*B42D 15/10* (2006.01)
(52) U.S. Cl. .................. 713/176; 713/179; 283/72
(58) Field of Classification Search ............. 713/179, 713/176; 235/457; 283/72
See application file for complete search history.

(56) References Cited

U.S. PATENT DOCUMENTS

| | | | |
|---|---|---|---|
| 4,947,028 A | 8/1990 | Gorog | |
| 5,053,956 A | 10/1991 | Donald et al. | |
| 5,262,860 A | 11/1993 | Fitzpatrick et al. | |
| 5,288,976 A | 2/1994 | Citron et al. | |
| 5,385,371 A | 1/1995 | Izawa | |
| 5,463,209 A | 10/1995 | Figh et al. | |
| 5,495,581 A | 2/1996 | Tsai | |
| 5,496,071 A | 3/1996 | Walsh | |
| 5,530,852 A | 6/1996 | Meske, Jr. et al. | |
| 5,613,004 A | 3/1997 | Cooperman et al. | |
| 5,640,193 A | 6/1997 | Wellner | |
| 5,659,164 A | 8/1997 | Schmid et al. | |
| 5,673,316 A | 9/1997 | Auerbach et al. | |
| 5,721,788 A | 2/1998 | Powell et al. | |
| 5,742,845 A | 4/1998 | Wagner | |
| 5,761,606 A | 6/1998 | Wolzien | |
| 5,761,686 A | 6/1998 | Bloomberg | |
| 5,774,664 A | 6/1998 | Hidary et al. | |
| 5,774,666 A | 6/1998 | Portuesi | |
| 5,778,102 A | 7/1998 | Sandford, II et al. | |
| 5,804,803 A | 9/1998 | Cragun et al. | |
| 5,809,317 A | 9/1998 | Kogan et al. | |
| 5,818,441 A | 10/1998 | Throckmorton et al. | |
| 5,822,432 A | 10/1998 | Moskowitz et al. | |
| 5,838,458 A | 11/1998 | Tsai | |
| 5,848,413 A | 12/1998 | Wolff | |
| 5,857,038 A | 1/1999 | Owada et al. | |
| 5,872,589 A | 2/1999 | Morales | |

| | | |
|---|---|---|
| 5,892,900 A | 4/1999 | Ginter et al. |
| 5,900,608 A | 5/1999 | Iida |
| 5,903,729 A | 5/1999 | Reber et al. |
| 5,905,248 A | 5/1999 | Russell et al. |
| 5,905,800 A | 5/1999 | Moskowitz et al. |
| 5,913,210 A | 6/1999 | Call |
| 5,915,027 A | 6/1999 | Cox et al. |
| 5,918,214 A | 6/1999 | Perkowski |
| 5,932,863 A | 8/1999 | Rathus et al. |
| 5,933,829 A | 8/1999 | Durst et al. |
| 5,938,726 A | 8/1999 | Reber et al. |
| 5,940,595 A | 8/1999 | Reber et al. |
| 5,978,773 A | 11/1999 | Hudetz et al. |
| 5,984,366 A * | 11/1999 | Priddy .................. 283/72 |
| 5,986,651 A | 11/1999 | Reber et al. |
| 6,012,102 A | 1/2000 | Shachar |
| 6,052,486 A | 4/2000 | Knowlton et al. |
| 6,081,827 A | 6/2000 | Reber et al. |
| 6,098,106 A | 8/2000 | Philyaw et al. |
| 6,107,932 A * | 8/2000 | Walker et al. ............ 340/5.22 |
| 6,108,656 A | 8/2000 | Durst et al. |
| 6,148,331 A | 11/2000 | Parry |
| 6,185,312 B1 | 2/2001 | Nakamura et al. |
| 6,216,227 B1 * | 4/2001 | Goldstein et al. .......... 713/172 |
| 6,311,214 B1 | 10/2001 | Rhoads |
| 6,345,104 B1 | 2/2002 | Rhoads |
| 2001/0018660 A1 * | 8/2001 | Sehr .............................. 705/5 |
| 2002/0078357 A1 | 6/2002 | Bruckers et al. |

FOREIGN PATENT DOCUMENTS

| | | |
|---|---|---|
| EP | 0493091 | 7/1992 |
| WO | WO95/14289 | 5/1995 |
| WO | WO95/20291 | 7/1995 |
| WO | WO96/27259 | 9/1996 |
| WO | WO96/36163 | 11/1996 |
| WO | WO97/02522 | 1/1997 |
| WO | WO97/43736 | 11/1997 |
| WO | WO98/03923 | 1/1998 |
| WO | WO98/51036 | 11/1998 |
| WO | WO99/57623 | 11/1999 |
| WO | WO 01/97175 | 12/2001 |
| WO | WO 02/03328 | 1/2002 |

OTHER PUBLICATIONS

Alattar, Adnan; "Smart Images" Using Digimarc's Watermarking Technology; IS&T/SPIE's 12th International Symposium on Electronic Imaging, San Jose, CA, Jan. 25, 2000, vol. 3971, No. 25, 1.
U.S. Appl. No. 60/000,442, Hudetz, filed Jun. 22, 1995.
IBM Technical Disclosure Bulletin 96A 61092, published Jan. 1, 1996.
"Distributing Uniform Resource Locators as Bar Code Images," IBM Technical Disclosure Bulletin, No. 39, No. 1, pp. 167-168, 96A 60059, published Jan. 1, 1996.
Frequently Asked Questions about Digimarc Signature Technology, Aug. 1, 1995, 9 pages.
Bartlett, et al., "An Overview of HighWater FBI Technology," Posted on Internet Mar. 22, 1996, 12 pages.
Digimarc presentation at RSA Conference, Jan. 1996, 4 pages.
"Digital Watermarks What Are They?" Digimarc Corporation, 1997.
Seybold Report on Internet Publishing, vol. 1, No. 4, Dec. 1996.
Seybold Report on Publishing Systems, vol. 25, No. 6, 1996.
Bethoney, "A Lasting Way For Artists To Leave Their Mark," PCWeek, Dec. 11, 1996.
Digital Media Monthly, Aug., 1996 (excerpt re Highwater FBI).
Digimarc Press Releases (various), 1996-1998.
Simone, "A Digita Watermark for Images," PC Magazine Dec. 18, 1996.
"Copyright Protection for Digital Images, Digital Fingerprinting from FBI," Highwater FBI brochure, 1995, 4 pages.
"Highwater FBI Limited Presentation, Image Copyright Protection Software," FBI Ltd brochure, Jul. 1995, 17 pages.

* cited by examiner

*Primary Examiner*—Matthew Smithers
(74) *Attorney, Agent, or Firm*—Digimarc Corporation (57) ABSTRACT

A method and system that registers data carried by a watermark with a server, reads watermark data from a document and generates an action string if a watermark read from a document matches registered data. In one embodiment the system includes two servers. Registration is done on one server via the internet the registration data is sent to a second server. The second server is interrogated via a local area network (LAN) to determine if particular watermark data is registered. The LAN allows data carried on documents such as tickets to be authenticated very quickly. In a second embodiment, there are multiple registration servers, each of which registers a different sets of watermark data. The compartmentalization of data increases security and privacy of data.

19 Claims, 5 Drawing Sheets

DISTRIBUTED SYSTEM FOR RESPONDING TO WATERMARKED DOCUMENTS

The present application is a continuation in part of application Ser. No. 9/571,422, filed May 15, 2000 (now U.S. Pat. No. 6,947,571), which is a CIP of each of the following applications;
1) Ser. No. 09/314,648, filed May 19, 1999 (now U.S. Pat. No. 6,681,028)
2) Ser. No. 09/342,688, filed Jun. 29, 1999 (now U.S. Pat. No. 6,650,761)
3) Ser. No. 09/342,689, filed Jun. 29, 1999 (now U.S. Pat. No. 6,311,214)
4) Ser. No. 09/342,971, filed Jun. 29, 1999 now abandoned
5) Ser. No. 09/343,101, filed Jun. 29, 1999 now abandoned
6) Ser. No. 09/343,104, filed Jun. 29, 1999 now abandoned
7) 60/141,468, filed Jun. 29, 1999
8) 60/151,586, filed Aug. 30, 1999
9) 60/158,015, filed Oct. 6, 1999
10) 60/163,332, filed Nov. 3, 1999
11) 60/164,619, filed Nov. 10, 1999
12) Ser. No. 09/531,076, filed Mar. 18, 2000
13) Ser. No. 09/543,125, filed Apr. 5, 2000
14) Ser. No. 09/547,664, filed Apr. 12, 2000, and
15) Ser. No. 09/552,998, filed Apr. 19, 2000, now abandoned

FIELD OF THE INVENTION

The present invention relates to computer systems and more particularly to a system for handling documents that contain a digital watermark.

BACKGROUND AND SUMMARY OF THE INVENTION

The technology for inserting digital watermarks in documents and the technology for detecting and reading digital watermarks that are embedded in documents is well developed. Furthermore, methods and systems for linking to internet sites in response to physical objects that contain watermarks are known. For example see co-pending application Ser. No. 09/571,422 May 15, 2000 entitled "Methods and Systems for Controlling Computers or Linking to Internet Resources from Physical and Electronic Objects" the content of which is hereby incorporated herein by reference.

It is also noted that a system marketed by Digimarc Corporation under the trademark "Media-Bridge" includes a central computer which accepts and registers identification numbers and associated action strings, and software which reads a watermark containing an identification number. When a watermark is read, the data base is interrogated via the Internet to locate a previously registered action string, and a response is returned to the requesting software via the Internet.

In some situations, the turn around time between when a watermark is read and when a desired action occurs is very critical. For example, watermarks on a ticket for an event can be used to carry authentication data. The data carried by the watermark on the ticket can be compared to data registered on a server in order to authenticate the ticket. When a ticket is presented at an entry point for an event, the ticket must be authenticated very quickly. The present invention provides a system which can be used to very quickly authenticate documents such as tickets through a local area or a wide area network. The authentication is done without the use of communication via the Internet. Tickets may be sold at many different locations, hence, identification data is registered at a central site using the Internet. At a specified time, the registration data is downloaded to a computer data base at a local site where the tickets will be presented for entry to an event. At the time of the event, when the tickets are presented for authentication, the identification is done quickly for the local data base via a local area network (LAN). Data for tickets sold after the initial download can be downloaded as increments to the local data base.

In other situations, for security considerations, it is not desirable to store all the registration data in a single local data base. In one embodiment, the present invention provides a number of local computers which exchange data on a peer to peer basis. Thus the data can be compartmentalized for security reasons.

In still other situations, due to security and other considerations, it is desirable that all communication be over a local area or wide area network other than the Internet. The present invention provides a system that can operate on a local area network (LAN) or on a wide area network (WAN).

DETAILED DESCRIPTION

Figure 1:
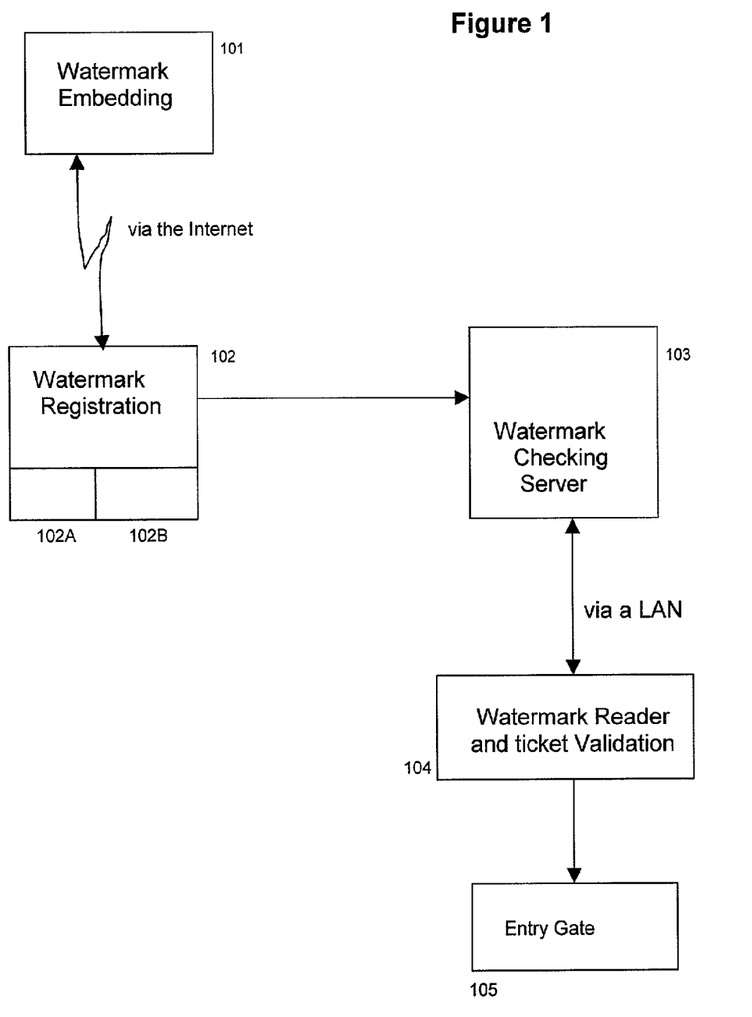
FIG. 1 is a system diagram of a first embodiment of the invention.

An overall system diagram of a first embodiment of the invention is illustrated in FIG. 1. The overall purpose of system is to authenticate tickets for events such as concerts or sporting events. It is important to note, that the time constraints that are involved when tickets are sold is very different from the time constraints involved when tickets are presented for entry to an event. When tickets are presented for entry to an event they must be validated very quickly. The present system is designed to fulfill this requirement.

Each ticket includes watermark data which is unique to the particular ticket. When a ticket is sold, the data in the watermark of the ticket is registered at server 102. The tickets can be printed at the time of sale and a watermark can be embedded in the ticket at that time, or tickets can be pre-printed and at the time a ticket is sold, the watermark in the ticket can be read and registered at server 102.

The tickets are authenticated when they are presented for entry to the event as follows: The watermark in the presented ticket is read. The data in the watermark is sent to watermark checking server 103 which checks to see if the particular ticket in question has been registered as having been sold.

It is noted that while as described herein the system is used to check tickets for events such as concerts or sporting events, the system can be used to authenticate any ticket, image or document that contains a watermark. Generally tickets are sold at many widely dispersed points, hence, entry of the data via internet is convenient. Furthermore selling tickets is a relatively time consuming operation, hence communication via the internet is acceptable even if it involves some slight delays. However, validating tickets when they are presented for entry to an event is a very time sensitive operation. Any delay is unacceptable and the validation must be made without delay. Due to the necessity for speed, the validation station is connected to the watermark checking server via an Ethernet LAN connection.

The system includes a central watermark registration server 102 that can be located anywhere and a watermark checking server 103 that is located near the place here tickets are presented for validation. The watermark registration server 102 includes a watermark registration program 102A and a database 102B. The watermark registration program 102A receives watermark registration information from an entry station when a ticket is sold. This information is generally (but not necessarily) provided to the watermark registration sever 102 via the internet. Thus, watermark registration server 102 collects and stores in a data base 102B, information which identifies the unique data in the watermarks on each of the tickets which is sold.

Information from the watermark registration server 102 is downloaded to a watermark checking server 103 at a designated time prior to when patrons are expected to present tickets for validation. The system includes a ticket validation station 104 which includes a watermark reading mechanism. When a ticket is presented for entry to an event, the watermark in the ticket is read by a conventional watermark reading program. The data in the watermark is checked against the data in the watermark checking server 103 to determine if the particular ticket is valid. If the data in the watermark of a ticket presented for entry is registered in the watermark checking server 103, an "action string of data" is returned to the watermark checking station. The action string can be command data that would open an entry gate 105. Alternatively it could be merely data that would be flashed on a screen to indicate that a particular ticket is valid.

Figure 2:
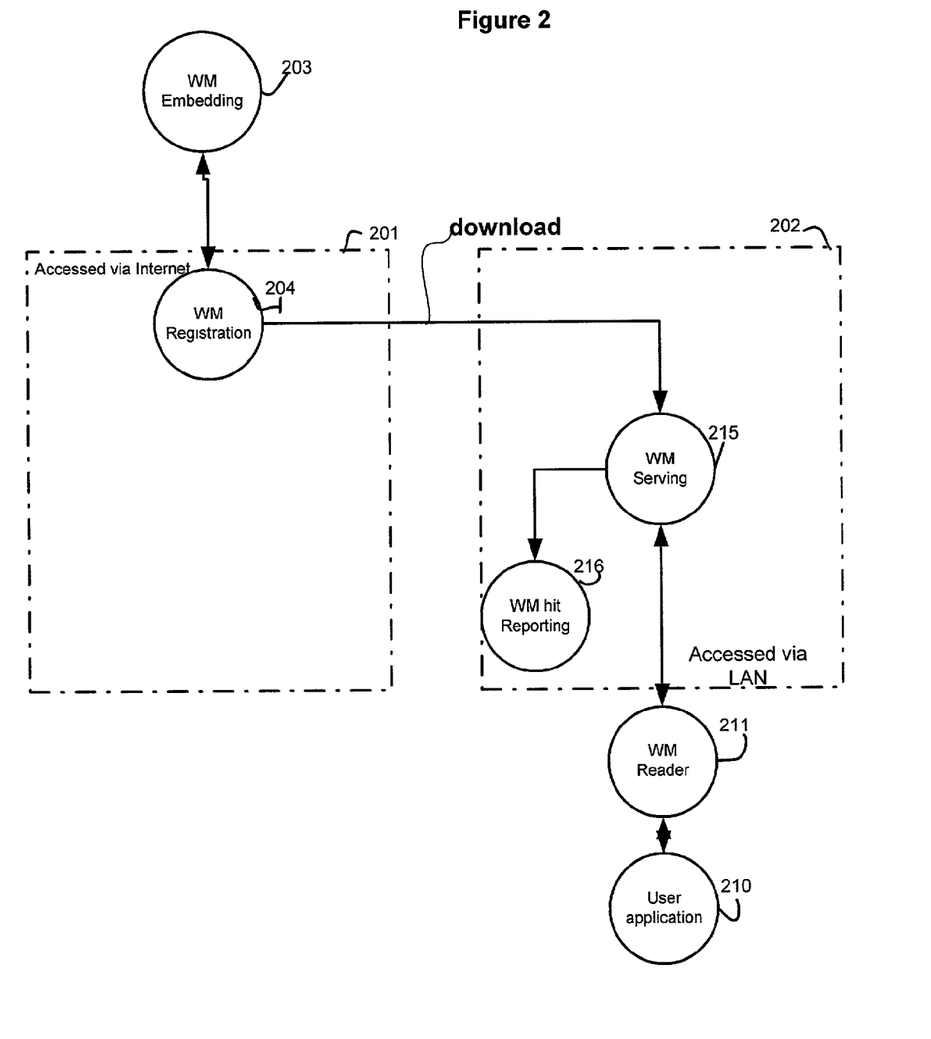
FIG. 2 is a program flow diagram of a first embodiment of the invention.

FIG. 2 is a program flow diagram showing the operations performed by the various elements in the system. Dotted line 201 indicates the operations performed at a central server 102 and dotted line 202 indicates operations performed at a server 103 which is located at the site where tickets are presented for verification. The process begins at block 203 where a watermark in embedded in a ticket using prior art technology. Each ticket is watermarked with data that is unique to the particular ticket. That is, each ticket contains different watermark data. When a particular ticket is sold, the watermark data in that particular ticket is registered at server 102 as indicated by block 204. Prior to the start of the event for which the tickets are being sold, data is downloaded from the central server 102 to the server 103 at the location of the event. This can either be done once after tickets sales have stopped, or it can be done incrementally as tickets are sold.

The system can include an application program 210 which for example scans a ticket and opens a gate if the ticket is validated. The watermark on the ticket is read using conventional watermark reading program 211, and the data base 215 is interrogated to determine if the particular ticket contains a watermark which has been registered indicating that the ticket is valid. If the ticket has been registered as having been sold, a signal is sent to the application program 210 to take the appropriate action such as to open a gate.

It is noted that the user application program 210 and the watermark reader 211 are connected to the watermark checking server 103 via a high speed LAN connection. Thus, the communication involved with checking and authenticating a ticket proceeds at high speed with a minimum of delay.

The system can include a hit recording program 216 which keeps track of the number of tickets that have been presented for verification. This system can record a wide variety of statistics. For example it can analyze where tickets presented for verification have been sold and it can record the number of un-validated tickets presented.

Figure 3:
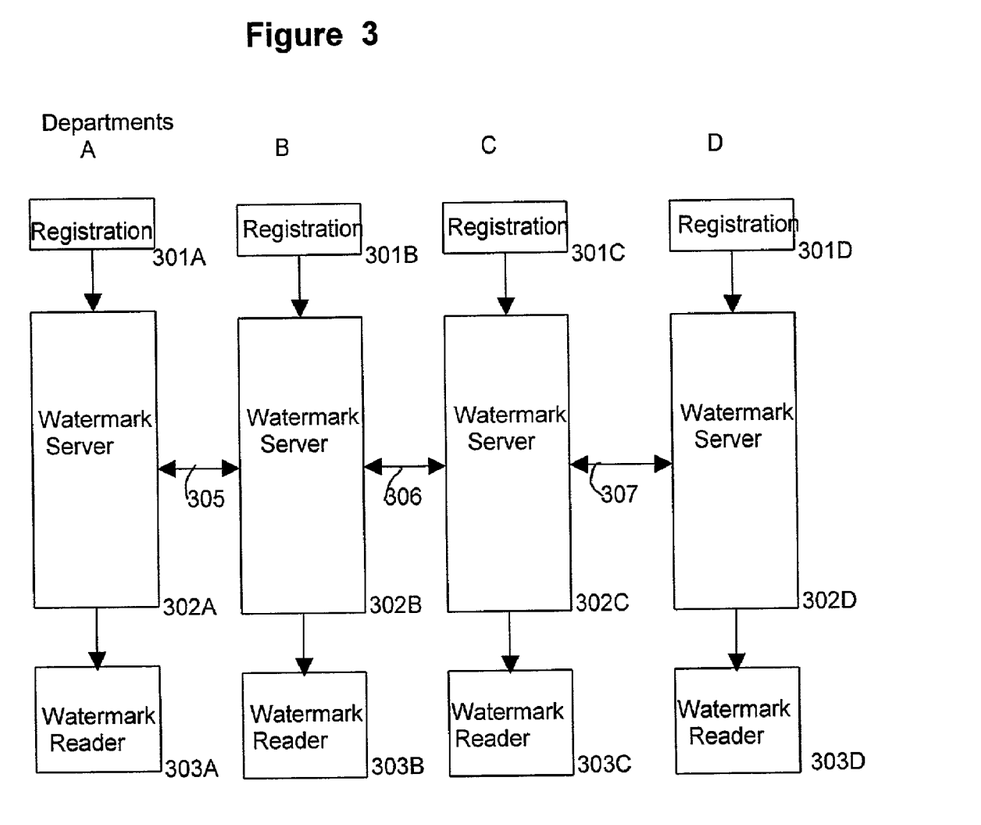
FIG. 3 is a system diagram of a second embodiment of the invention.

A second embodiment of the invention is shown in FIG. 3. In this embodiment, the registration servers operate on a peer to peer basis. There can be any number of such servers connected in a network. For simplicity of illustration and explanation in the example shown in FIG. 3, only four peer to peer servers are shown; however it should be understood that there can be more similarly connected. Each server may for example be associated with a different department in an organization. In the example illustrated in FIG. 3, the servers are associated with four separate departments A to D. Each department could for various security considerations, desire to register and keep from access by other departments certain watermarks. The registration of other watermarks could be exchanged between departments.

Each Department A to D has a watermark embedding and registration input 301A to 301D. These are conventional devices which embed particular watermark data in an image and which ten register the watermark with a registration server. In the example illustrated the servers are designated 302A to 302D. These servers could be physically separate computers or they could be independent servers operating on a single computer. Separate computers provide added security. Each department A to D also has an associated application program and watermark reader 303A to 303D. The watermark readers 303A to 303D check to see if the information read from the watermark in a particular image is registered on the associated server 302A to 302D.

In some situations, a department may desire to have a particular watermark registered on some other servers in addition to the server associated with the particular department. There is a connection between the servers designated 305 to 307 which allows exchange of registration information between the servers. Each registered watermark includes an indication of the particular servers on which the watermark should be registered. There is communication between the servers. When a particular watermark is registered, the user registering the watermark can indicate the particular servers on which the particular watermark should be registered. For example, in a situation where there are ten registration servers connected on a peer to peer basis, the user registering a watermark, might indicate that it should only be registered on the one server in that department, or he might designate nine servers and indicate that it should be register on only these nine of the ten servers, or he might indicate that it should be registered on all of the servers, etc.

Figure 4:
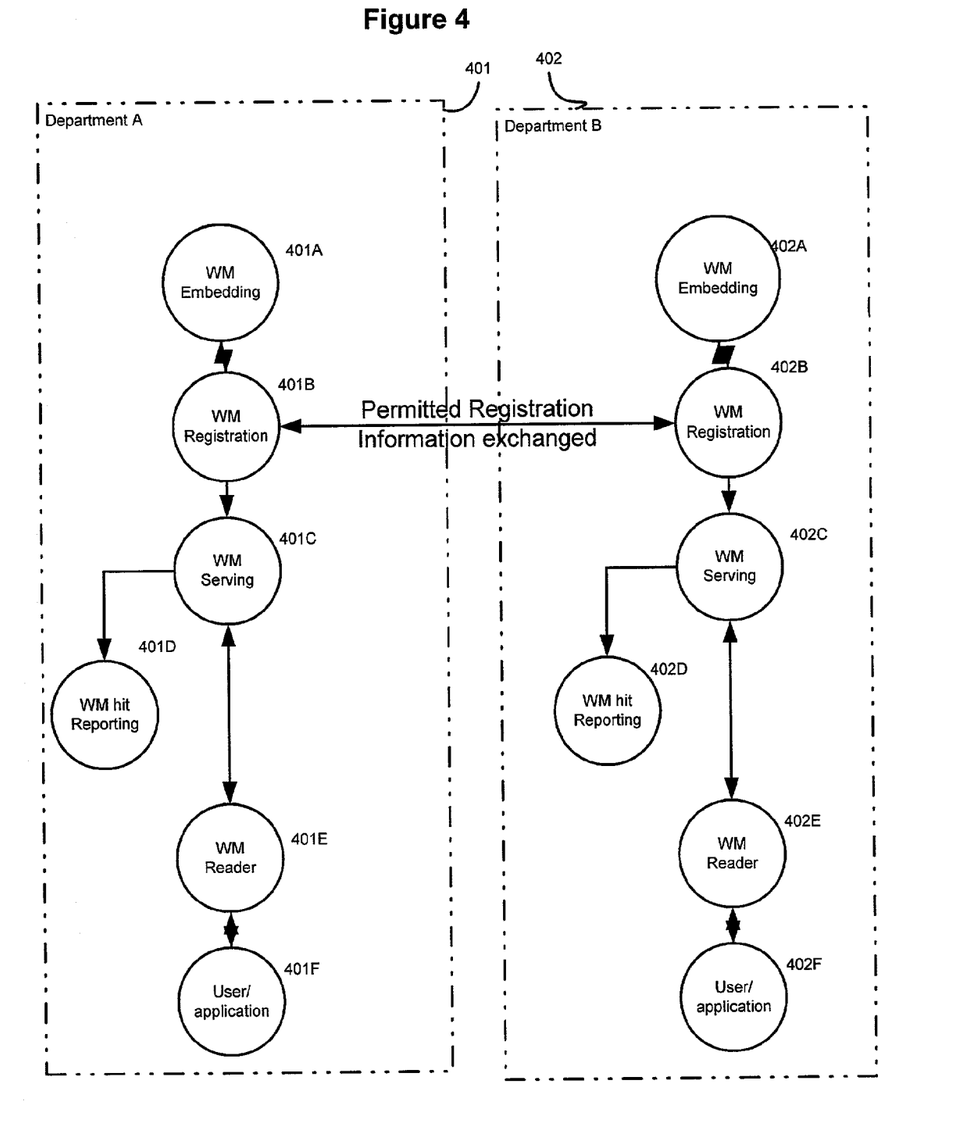
FIG. 4 is a program flow diagram of a second embodiment of the invention.

FIG. 4 is a program flow diagram illustrating the operation performed by the system shown in FIG. 3. The doted blocks 401 and 402 illustrate the operations performed by the systems for departments A and B. The systems at each of the other departments perform similar operations. The watermark embedding steps 401A and 401B and 402A and 402B proceed as in the prior embodiments; however, when a watermark is registered, an indication is given concerning on which servers the watermark should be registered. Likewise the users application programs 401F and 402F, the watermark reading steps 401E and 402E individually proceed as in the prior embodiments. That is each of the servers 301A, 301B etc. individually operate as described as the previously referenced co-pending applications, except that when a watermark is registered, some additional data is entered into the registration data base. When a watermark is registered, an entry is made as to which servers would store the registration information in addition to the server with which the mark is registered. Thus, each watermark is registered with one server, and if the appropriate instruction is given when the watermark is registered, the registration information is transmitted to other designated servers.

Figure 5:
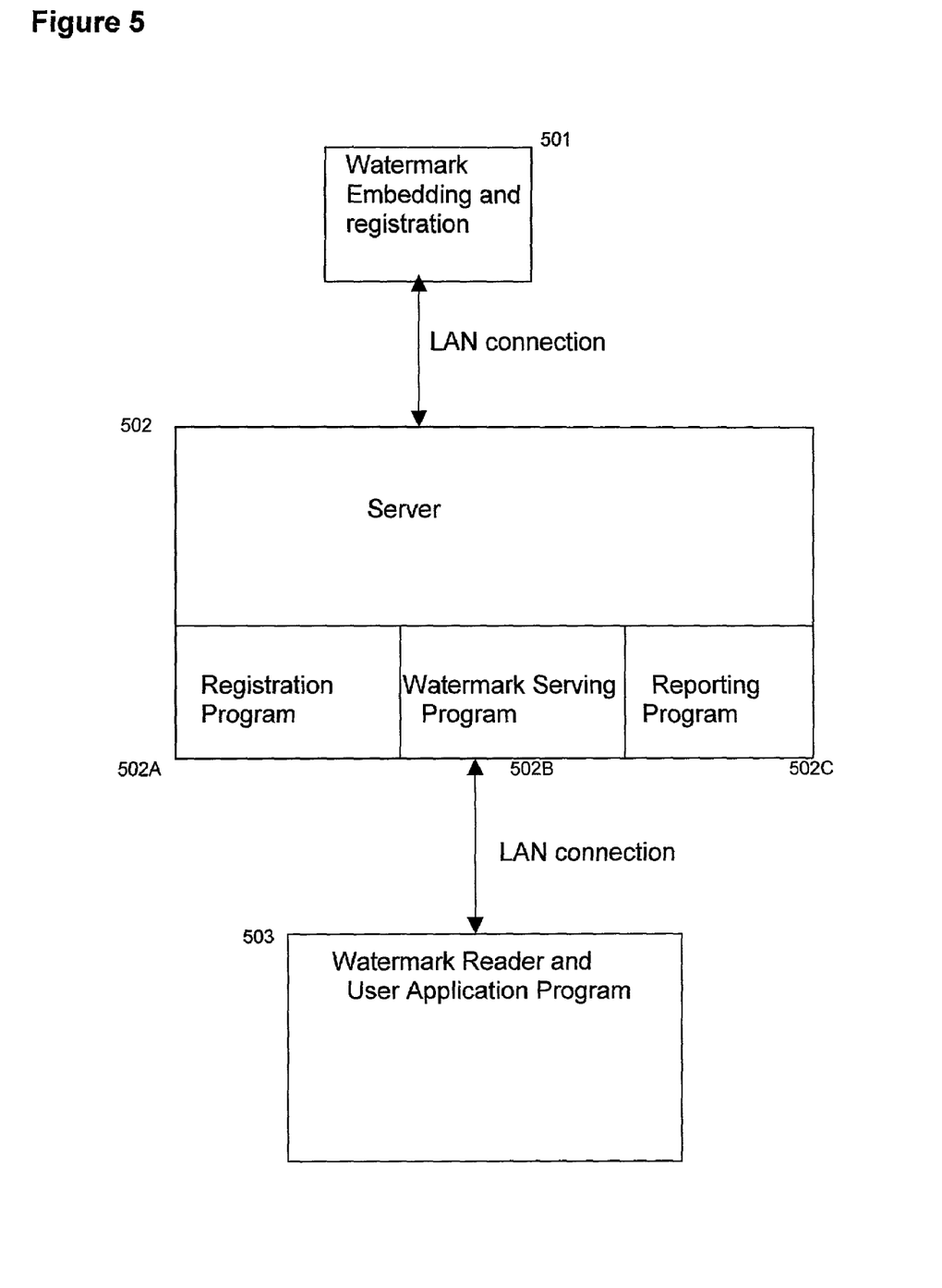
FIG. 5 is a system diagram of a third embodiment of the invention.

A third embodiment of the invention is illustrated in FIG. 5. In this third embodiment, all the units are connected via high speed LAN connections rather than via the internet. This system can for example be used by an organization that desires it own self contained system for registering and responding to requests from a watermark reader. The system includes a computer server 502 that includes a watermark registration program 502A and a watermark serving program 502B. The system can also include a watermark hit recording program 502C. One or more watermarking embedding and registration input stations 501 operate similar to the previously described systems except that they are connected to the computer 500 via a local area network (LAN) connection. Likewise the watermark reader and the user application 503 operate similar to the previously described embodiments except that they are connected to the computer 502 via a LAN connection. The LAN provides for high speed and more secure communication than does an Internet connection.

The contents of application Ser. No. 09/571,422 May 15, 2000 (now U.S. Pat. No. 6,947,571), entitled "Methods and Systems for Controlling Computers or Linking to Internet Resources from Physical and Electronic Objects" is incorporated herein by reference to provide details of some of the elements shown herein in block diagram form. While the invention has been shown and described with respect to a number of preferred embodiments, it should be understood that various other changes in format and detail can be made without departing from the spirit of the invention. The scope of the invention is limited only by the appended claims.

I claim:

1. A method for validating an admission ticket to an event comprising:
    inserting a digital watermark in an admission ticket, the digital watermark including unique watermark data, wherein the digital watermark is hidden through subtle changes of data carried by the admission ticket,
    registering the unique watermark data as registered information with a registration server when the admission ticket is sold,
    transferring the registered information to a second server,
    validating the admission ticket when the admission ticket is presented for entry to the event, said validating being via a local area network connection to the second server to determine if the unique watermark data in the ticket presented for validation is registered on the second server.

2. The method recited in claim 1 wherein the registration of the unique watermark data is via the Internet.

3. The method recited in claim 1 wherein an action string is returned if the admission ticket is validated.

4. The method recited in claim 1 wherein an action string of data which opens a gate is returned if the admission ticket is valid.

5. A system for validating admission tickets to an event, comprising,
    a printing system for printing tickets, each ticket including a digital watermark carrying unique information, wherein the digital watermark is hidden through subtle changes to printing on the admission ticket.
    a registration system for registering validation data in a first server including the unique information in a ticket when a ticket is sold,
    a second server and a program for transferring said validation data to said second server,
    a ticket validation station connected by a local area network (LAN) to said second server,
    a watermark reading program at said ticket validation station, and
    a program to determine if a ticket presented for registration is valid by interrogating said second server via said LAN connection and for receiving a response from said server via said LAN connection.

6. The system recited in claim 5 wherein said registration is via communication on the Internet.

7. The system recited in claim 5 wherein said response validates a ticket if the watermark on said ticket is registered on said server.

8. The system recited in claim 5 wherein said response opens an entry gate if said ticket is registered on said server.

9. A method of generating a response to a digital watermark read from an object, wherein the digital watermark is hidden through subtle changes of data carried by the object, said method comprising:
    registering in a first server an identifier associated with the digital watermark together with an indication of an appropriate response to data carried by the digital watermark, wherein the identifier and indication are included in the first server as registration information,
    transferring the registration information to a second server,
    reading at a first station the data carried by the digital watermark,
    communicating the data to the second server utilizing a high speed connection and determining an appropriate response to the data with reference to at least the registration information, and transmitting the response to the first station.

10. The method recited in claim 9 wherein the object comprises an entry ticket for an event.

11. The method recited in claim 10 wherein a ticket is validated by the response if the ticket is registered on the first server and the second server.

12. The method recited in claim 9 wherein the appropriate response is a validation of the object if the digital watermark carried by the object is registered on the second server.

13. The method of claim 9 wherein the high speed connection comprises a local area connection.

14. The method of claim 9 wherein the object comprises at least one of a physical object, audio and video.

15. The method of claim 14 wherein the registration with the first server is carried out via the Internet.

16. A system for registration of data contained in digital watermarks and for providing a response to data read from a digital watermarked object, said system comprising:
    a plurality of subsystems, each subsystem comprising,
        a program for registering data which is embedded in a digital watermark hosted by an object, said registration data including an indication of a subsystem on which the registration data should be registered,
        a server for storing the registration data, and
        a program for reading a particular digital watermark hosted by an object to determine if the data carried by the particular digital watermark is registered on the subsystem.

17. The system recited in claim 16 wherein said plurality comprises two subsystems.

18. A system for generating a particular action string in response to data read from a digital watermark on a document, wherein the digital watermark is hidden through subtle changes of data carried by the document, said method comprising:
- a server including a data base of registered digital watermarks, each registered digital watermark having an associated action string,
- a registration station connected to said server via a local area network (LAN) to register particular digital watermarks and the associated action string,
- an interrogation station connected to said server via a LAN including a program for reading a digital watermark and for interrogating the data base on said server to determine if said particular digital watermark is registered and if said digital watermark is registered for retrieving the associated action string.

19. The system recited in claim 18 wherein said action string indicates if a document is registered on said server.

* * * * *